(12) United States Patent
Cowley et al.

(10) Patent No.: US 6,967,010 B2
(45) Date of Patent: Nov. 22, 2005

(54) CHLORINE DIOXIDE GENERATOR

(75) Inventors: Gerald Cowley, Missauga (CA); David Andrew Dean, Missauga (CA)

(73) Assignee: Superior Plus Inc., Calgary (CA)

( * ) Notice: Subject to any disclaimer, the term of this patent is extended or adjusted under 35 U.S.C. 154(b) by 526 days.

(21) Appl. No.: 09/788,585

(22) Filed: Feb. 21, 2001

(65) Prior Publication Data

US 2002/0021990 A1 Feb. 21, 2002

Related U.S. Application Data

(60) Provisional application No. 60/183,804, filed on Feb. 22, 2000.

(51) Int. Cl.[7] .............................. C01B 11/02; B05B 7/12
(52) U.S. Cl. ......................... 422/305; 422/256; 261/76; 261/DIG. 56; 261/DIG. 75
(58) Field of Search ................................. 422/305, 256, 422/257; 261/76, DIG. 75, DIG. 56

(56) References Cited

U.S. PATENT DOCUMENTS

| | | | | |
|---|---|---|---|---|
| 1,052,051 A | * | 2/1913 | Grimes ........................ 261/53 |
| 3,282,227 A | * | 11/1966 | Nielsen ....................... 417/167 |
| 4,019,983 A | * | 4/1977 | Mandt ......................... 210/754 |
| 4,143,115 A | * | 3/1979 | Ward et al. .................. 422/113 |
| 4,247,531 A | * | 1/1981 | Hicks .......................... 423/477 |
| 4,275,017 A | * | 6/1981 | Rollins ........................... 261/53 |
| 4,563,782 A | * | 1/1986 | Dijkhuizen ................. 4/541.4 |
| 5,968,454 A | | 10/1999 | Deacon et al. .............. 422/120 |

OTHER PUBLICATIONS

D. Gates' book "The Chlorine Dioxide Handbook", Chapter 3 ("Commercial Designs for Full–Scale Chlorine Dioxide Generators") 1998, pp. 23 to 54.

* cited by examiner

Primary Examiner—Elizabeth McKane
(74) Attorney, Agent, or Firm—Sim & McBurney

(57) ABSTRACT

A chlorine dioxide generator comprises a water eductor surrounded by a variable volume plenum. The plenum casing is threaded onto the venturi body, permitting the plenum volume and area to be modified depending on the capacity required. Chlorine and sodium chlorite may be fed tangentially into a conical plenum and reacted therein to form chlorine dioxide, which is discharged into water passing through the eductor at the venturi throat.

7 Claims, 1 Drawing Sheet

CHLORINE DIOXIDE GENERATOR

REFERENCE TO RELATED APPLICATION

This application claims priority under 35 USC 119(e) from U.S. Provisional Patent Application No. 60/183,804 filed Feb. 22, 2000.

FIELD OF INVENTION

The present invention relates to an improved apparatus for generating chlorine dioxide from chlorite in a wide range of production rates and feed compositions.

BACKGROUND TO THE INVENTION

Chlorine dioxide ($ClO_2$) is a selective oxidizing agent widely used in pulp bleaching, water disinfection and numerous other applications. Due to its inherent instability, it cannot be transported and, therefore, is produced in situ at its point of use.

Commercial methods for chlorine dioxide generation are based on two types of precursor chemicals, namely chloric acid/chlorates and chlorous acid/chlorites.

Large-scale $ClO_2$ generators, typically used in pulp bleaching applications, are usually based on the reduction of acidified chlorate ion solution, whereas smaller scale applications, such as water treatment and disinfection, utilize a one-electron oxidation of chlorite ion, employing a wide variety of oxidizing agents, such as chlorine, hypochlorite, chlorous acid, persulfate, etc.

The most commonly used oxidizing agent utilized in the latter process is chlorine which may be the form of gas or in solution. The chlorine dioxide generation reaction proceeds in solution according to the following equations (1), (2) and (3) and overall equation (4):

$$Cl_2 + H_2O \rightarrow HOCl + H^+ + Cl^- \quad (pH<7) \qquad (1)$$

[Hypochlorous acid]

$$2ClO_2^- + 2H^+ \rightarrow 2HClO_2 \quad (pH<8.3) \qquad (2)$$

[Chlorous acid]

$$2HClO_2^- + HOCl \rightarrow 2ClO_2 + Cl^- + H_2O + H^+ \qquad (3)$$

[Chlorine dioxide]

$$2ClO_2^- + Cl_2 \rightarrow 2ClO_2 + 2Cl^- \qquad (4)$$

An undesirable reaction occurs at higher pH with excess hypochlorous acid, namely:

$$HOCl + 2ClO_2 \rightarrow ClO_3^- + Cl^- + H^+ \qquad (5)$$

In order to ensure a high conversion of chlorite ion to chlorine dioxide, an excess of chlorine is required, which is added first to water to reduce the pH of the resulting aqueous medium to less than 7. In practice, this excess of chlorine can range from about 5 to about 25% excess over stoichiometric requirements, for production of chlorine dioxide according to equation (4). This excess, as with all chemical reactors of this type, is dependent upon the degree of mixing and residence time within the reaction zone, which is typically only a fraction of a second, and the concentration of the feed reactants. However, the excess chlorine can react with the product chlorine dioxide in accordance with equation (5), reducing the overall yield. Excess chlorine can also form chlorinated disinfection by-products (DBP's), depending upon the organic content of the water. Reactions according to equations 1 to 4 are only dependant upon the degree of mixing. Typically, the pH of commercial sodium chlorite solutions is between about 9 to about 12, and this must be neutralized before reaction according to equation (2) can proceed, which is achieved by adding chlorine first.

There are numerous commercial chlorite-based $ClO_2$ generators available on the market which can satisfy these conditions. In a conventional $ClO_2$ generator, chlorine gas is mixed with water to produce hypochlorous acid, which then is mixed with alkali metal chlorite in a reaction chamber. This second reactant, (i.e. alkali metal chlorite), can be introduced to the reaction chamber either by pumping or induced by a vacuum device, such as a water eductor, which serves also to absorb the product chlorine dioxide in solution. Operating under vacuum in this manner is much preferred owing to its simplicity, and allows the use of concentrated sodium chlorite solution (typically about 25% w/w) and pure chlorine gas fed under vacuum directly into the device, thus vastly aiding reaction kinetics. However, water eductors are single volumetric capacity devices which are set by the water pressure provided, and the size selected. Thus, if the feed volumes of the reactants is reduced, then the vacuum exerted increases, which, in turn, reduces the reaction time available, because the two-phase reaction mixture is mainly gas.

Numerous patents related to the above described subject matter claim features, such as the order in which precursors are added, the relative positions of water ejectors/chemical feed pumps, the mode of operation (continuous vs intermittent), etc. A detailed description of chlorite ion based chlorine dioxide generators available on the market as of 1998 is described on pages 23 to 54 of D. Gates' book "The Chlorine Dioxide Handbook", Chapter 3 ("Commercial Designs for Full-Scale Chlorine Dioxide Generators"), the disclosure of which is incorporated herein by reference (along with all the patents and publications cited therein.).

All of the water eductor generators described in the above-mentioned reference are designed in such a way as to exhibit an optimum performance at a fixed production rate, specific to a fixed size eductor. In some cases, this can be compensated for by varying the addition of water to the reaction zone, but this only partially alleviates the change in conditions, as it reduces the concentration of the reactants in the reaction zone as well. The required output of a typical Municipal Water Treatment facility varies substantially during day and night (typically by a factor of two), and also seasonally between summer and winter (typically also a factor of two). In order to compensate for the reduction in efficiency experienced with current devices, users need to either switch to a second or third generator, sized to accommodate the changed capacity, or shut down and install a smaller or larger eductor.

The utilization of high feed concentrations of sodium chlorite has previously been described to be beneficial. Typically, about 25% w/w sodium chlorite solution is used in present practice. Higher concentrations with existing devices can lead to pluggage and scaling problems.

The use of a less concentrated sodium chlorite feed solution has a significant, negative impact on the overall process economics, due to increased chlorite storage requirements and concentration costs, as well as the equipment used in some cases to prepare weaker solution on-site prior to use.

There is a need, therefore, to develop a simple, yet reliable chlorine dioxide generating system which can operate efficiently over a wide range of capacities, with a minimum excess chlorine, and at the same time able to accept a more concentrated alkali metal chlorite feed solution, typically in the range of up to at least about 31 wt. % and preferably up to about 38 wt. %.

One recent proposal to alleviate the prior art problem of variable production rate is described in U.S. Pat. No. 5,968,454. However, this approach is deficient owning to its complexity, lack of reliability and inability to accept a concentrated alkali metal chlorite feedstock solution.

SUMMARY OF THE INVENTION

The present invention is directed towards the provision of an improved chlorite based chlorine dioxide generator able to efficiently produce chlorine dioxide over a wide range of production rates.

The present invention is further directed towards the provision of a generator operating efficiently even at highly concentrated alkali metal chlorite feed solutions.

The present invention is directed towards the provision of a higher purity chlorine dioxide product and thereby decreasing the concentration of disinfectant by-products in the treated water.

In accordance with present invention, a chlorine dioxide generator comprises a water eductor surrounded by a variable volume plenum. This plenum preferably is conical in shape, although it may also be cylindrical, or any other shape deemed suitable by those skilled in the art. The plenum volume is externally adjusted to vary the cross sectional area of the plenum reaction zone by rotating an external plenum casing towards an eductor inlet. The plenum casing is threaded onto the venturi body, and sealed using "O" rings. As the plenum casing is moved, the plenum volume is changed. If the device is required to produce a lower capacity, the plenum volume is reduced by moving the plenum casing towards the inlet.

Thus, the velocity of the reactants and dimensionless groups (Reynolds No., Power No. etc.) required to be kept constant for adequate mixing, are maintained within the plenum, and the residence time in the plenum is also maintained, as the pressure in the device is kept constant even though the eductor pulls a higher vacuum at the lower feedstock input rate at the exit of the plenum. The capacity settings of the device can be inscribed on the plenum casing and/or the sealing collar. Thus, as requirements change, it is a simple matter to move the plenum casing to the new setting for that capacity. This adjustment may be performed automatically for remote devices.

The chlorine dioxide generating reactants, such as chlorine and sodium chlorite, reactants are sprayed tangentionally into the plenum entry ring, thus producing a high degree of turbulence by spinning of the reactants. As the reactants thus spin towards the eductor ports, they accelerate due to the increased angular velocity created by the reduced diameter of the plenum, before the resulting chlorine dioxide is educted into the water stream. When using chlorine gas as a reactant in the chlorine dioxide generating reaction, the spin can further be initiated by connections drilled into the device, connecting a fixed flow of motive water into the plenum itself at a tangent. This addition of water thus allows the device to be manufactured in a machinable metal inert to all the precursors and products, and acts as online dilution for higher strength chemical feeds.

The variable plenum eductor can accommodate both two and three chemical feeds. Acid and hypochlorite feeds generating chlorine dioxide can be introduced to the device in a similar manner to that described above for chlorine.

The ability to tune the device for any desired capacity of chlorine dioxide generation allows the user to minimize chlorine requirements, as mixing efficiency can be maintained for each capacity. Typically with existing fixed eductor capacity devices, the excess stoichiometric chlorine needed to completely react all the feed chlorite has to be increased. Consequently, the efficacy of $ClO_2$ use decreases as the residual chlorine reacts with the product $ClO_2$ producing chlorate, as described above and also reacts with organics in water to produce trihalomethanes and haloacetic acids, both of which are carcinogenic and are regulated by the EPA (USA).

DESCRIPTION OF PREFERRED EMBODIMENT

Figure 1:
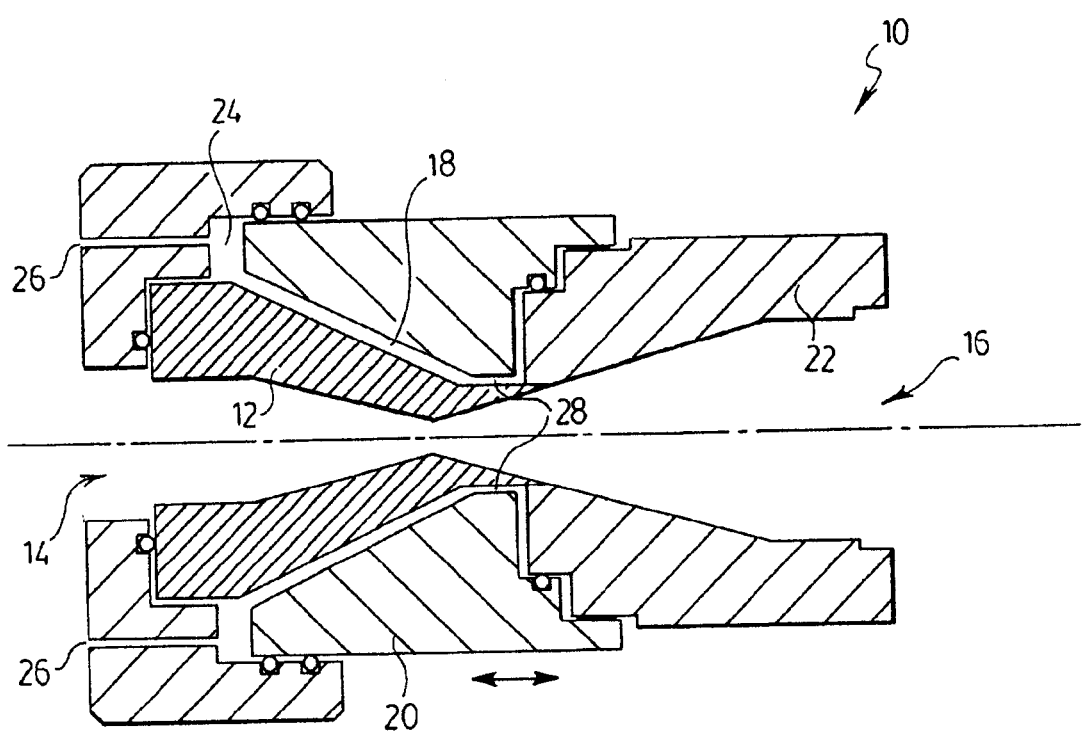
FIG. 1 is a schematic sectional view of an improved chlorine dioxide generator provided in accordance with one embodiment of the invention.

A chlorine dioxide generator 10 comprises a venturi 12 having an upstream inlet 14 for water to be treated and a downstream outlet 16 for treated water. The venturi 12 is surrounded by a plenum 18 defined by an outer casing 20.

The outer casing 20 is threadedly mounted to a venturi body 22 for rotation relative thereto to permit the volume of the plenum 18 to be modified as the plenum casing moves axially of the generator 10 relative to the venturi 12. The plenum is sealed by O-rings.

A reduction in volume and area of the plenum 18 facilitates a reduction in the capacity of the generator 10 while an increase in the volume and area of the plenum 18 facilitates an increase in the capacity of the generator 10.

The plenum 18 has an entry ring 24 into which the chlorine dioxide generating reactants are fed tangentially through feed ports 26. The reactants, rapidly reacting to form chlorine dioxide, accelerate through the plenum 18 due to the increased angular velocity produced by the decreasing volume of the plenum 18 in the downstream direction and the resulting chlorine dioxide is discharged into the flowing water stream at the venturi throat through injection ports 28.

SUMMARY OF DISCLOSURE

In summary of this disclosure, the present invention provides a novel alkali metal chlorite based chlorine dioxide generating process and apparatus, in which the capacity of a water eductor generator is adjustable to meet changing requirements while, at the same time, operating efficiently over a wide range of capacities with a minimum of excess chlorine. Modifications are possible within the scope of the invention.

What we claim is:

1. A chlorine dioxide generating apparatus, comprising:

a venturi having an inlet end for receiving fluid and an outlet end for expelling fluid;

a venturi body coupled to said outlet end of said venturi, said venturi body forming an extension of said outlet end of said venturi;

a casing surrounding said venturi and defining a plenum therebetween, said casing being movably connected to said venturi body;

a first sealing means provided between said casing and said venturi body for sealing said plenum;

a collar surrounding an end of said casing adjacent said inlet end of said venturi, said collar and said casing defining a plenum entry ring therebetween;

a second sealing means provided between said collar and said casing for sealing said plenum entry ring;

at least one feed port for tangentially receiving reactants, said feed port extending through said collar and communicating with said plenum entry ring;

at least one injection port for passing chlorine dioxide into said fluid, said injection port extending through said venturi adjacent said outlet end thereof, said injection port being in communication with said plenum; and wherein movement of said casing changes the volume and area of said plenum to determine the capacity of the generating apparatus.

2. The apparatus as claimed in claim 1 wherein an increase of said plenum volume and area facilitates an increase of said capacity of said generating apparatus and a decrease of said plenum volume and area facilitates a decrease of said capacity of said generating apparatus.

3. The apparatus as claimed in claim 1 wherein said venturi body has an externally threaded portion.

4. The apparatus as claimed in claim 1 wherein said casing has an internally threaded portion.

5. The apparatus as claimed in claim 4 wherein said casing threadably engages said venturi body and is axially movable thereon.

6. The apparatus of claim 1 wherein said plenum is conical in shape and decreases in volume in the downstream direction.

7. The apparatus as claimed in claim 1 wherein said first and second sealing means is at least one O-ring.

* * * * *